United States Patent [19]

Mahig et al.

[11] 4,095,667
[45] Jun. 20, 1978

[54] PORTABLE UNDERWATER SIGNALLING TRANSDUCER

[76] Inventors: Joseph Mahig, 701 SW. 91st St.; Carl Thomas Allen, 4175 NW. 12th Ave., both of Gainesville, Fla. 32601

[21] Appl. No.: 760,808

[22] Filed: Jan. 19, 1977

[51] Int. Cl.² .................. B63B 45/08; G01L 19/12
[52] U.S. Cl. .................. 181/120; 116/137 A; 181/113; 340/14
[58] Field of Search .......... 116/65, 26, 27, 70, 116/DIG. 44, 137 R, 137 A; 340/14; 73/300; 181/120, 113

[56] References Cited

U.S. PATENT DOCUMENTS

| | | | |
|---|---|---|---|
| 2,961,639 | 11/1960 | Atanasoff | 340/14 |
| 3,053,220 | 9/1962 | Sawyer | 116/137 A |
| 3,056,378 | 10/1962 | Simmonds | 116/70 |
| 3,224,409 | 12/1965 | Fenger et al. | 116/70 |
| 3,277,437 | 10/1966 | Bouyoucos | 116/137 A |
| 3,433,202 | 3/1969 | Sharp et al. | 116/27 |
| 3,719,160 | 3/1973 | Christianson | 116/70 |
| 4,010,708 | 3/1977 | Keledy et al. | 116/65 |

*Primary Examiner*—Daniel M. Yasich
*Attorney, Agent, or Firm*—Dowell & Dowell

[57] ABSTRACT

A portable underwater signalling apparatus for use by divers having self-contained underwater breathing apparatus (scuba) to signal to other divers as well as surface and underwater vessels. The apparatus utilizes compressed air from the diver's tanks to drive a hammer against a diaphragm to cause sound waves to be transmitted through the water.

6 Claims, 9 Drawing Figures

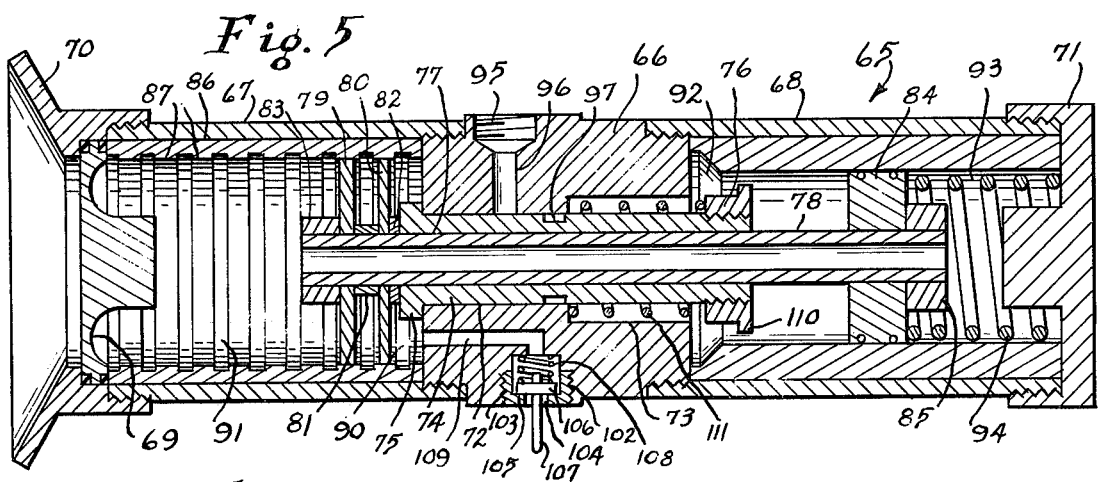
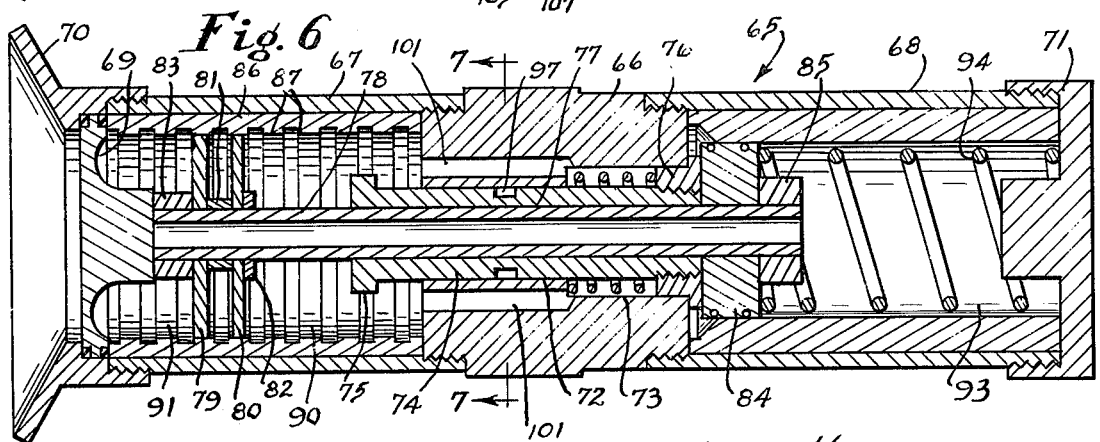
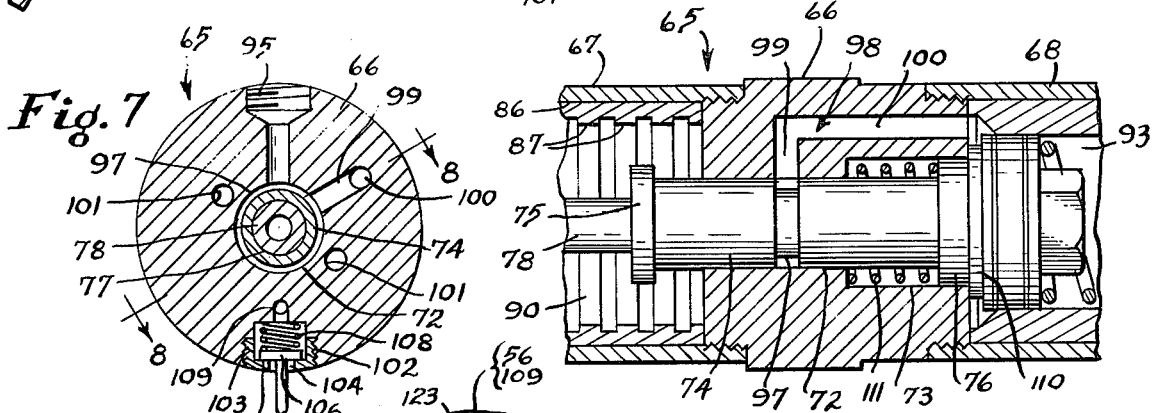
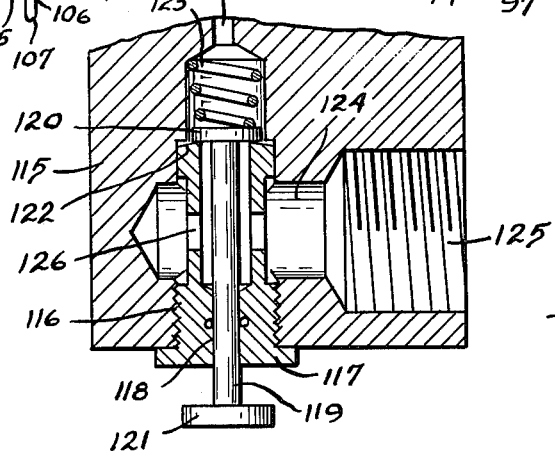

4,095,667

PORTABLE UNDERWATER SIGNALLING TRANSDUCER

BACKGROUND OF THE INVENTION

1. Field of the Invention

This invention relates generally to apparatus for generating an audible signal and relates particularly to a portable underwater signalling transducer in which a diver equipped with scuba gear may produce a high powered signal to call for help, warn other divers, help locate the position of other divers under difficult conditions, or communicate with surface or underwater vessels through a prearranged code.

2. Description of the Prior Art

Heretofore many sound generating devices have been provided for shipboard use to produce a high powered sound under water for either seismic or communication purposes. Most of the prior art devices have utilized steam, electrodynamic or hydrodynamic components to generate acoustic waves which pass through the water. Most of these prior art devices have been large and bulky and accordingly have not been acceptable for divers using scuba gear. Some examples of this type of prior art are the patents to Mellen U.S. Pat. Nos. 3,246,289, Sharp et al 3,433,202 and Copley 3,560,913.

Alsp some signalling devices have been provided for divers using scuba gear, such as the patents to Gagnan et al U.S. Pat. Nos. 3,144,171 and Christianson 3,719,160 which are connected to the scuba gear of a diver to produce an audible sound when the pressure in the air tanks has dropped to a predetermined low pressure. However, the structure defined by these patents is adapted to operate automatically when the pressure decreases and cannot be selectively operated by the diver.

SUMMARY OF THE INVENTION

The present invention is embodied in a portable underwater signalling transducer which can be easily carried by a skin diver equipped with scuba gear and can be easily operated to call for help, warn other skin divers of a potentially dangerous situation, help to locate the position of other divers, or otherwise communicate with another diver or a surface or underwater vessel. The transducer is connected to a source of high pressure air such as the air tanks of the scuba gear which can be used to drive a hammer against a diaphragm to produce impact generated acoustic waves which are automatically repeated as long as the transducer is operated.

It is an object of the invention to provide a portable underwater signalling transducer which can be easily connected to the scuba gear of a skin diver and used selectively to generate a loud high powered underwater noise for communicating with other skin divers or with surface or underwater vessels.

BRIEF DESCRIPTION OF THE DRAWINGS

FIG. 5 is a section of another embodiment of the invention illustrating the position of the components at the beginning of the power stroke.

FIG. 6 is a section similar to FIG. 5 illustrating the components at the completion of the power stroke and ready to begin the return stroke.

FIG. 7 is a section on the line 7—7 of FIG. 6.

FIG. 8 is a section on the line 8—8 of FIG. 7.

FIG. 9 is an enlarged section of another embodiment of the operating valve.

DESCRIPTION OF THE PREFERRED EMBODIMENTS

Figure 1:
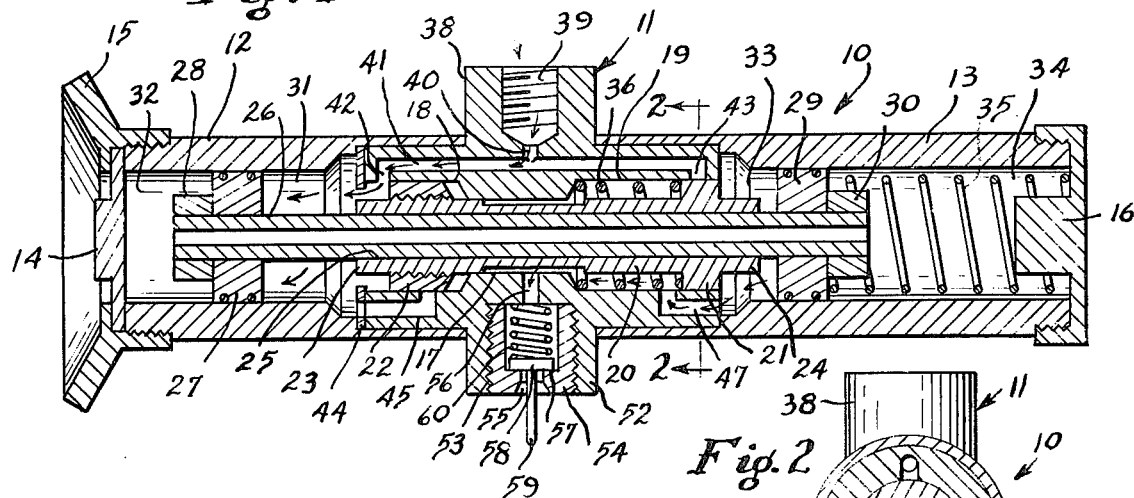
FIG. 1 is a cross-sectional view of the underwater signalling transducer illustrating substantially the "at rest" position.
Figure 2:
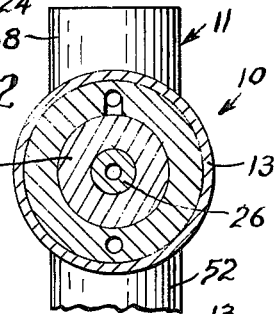
FIG. 2 is a section on the line 2—2 of FIG. 1.

With reference to FIGS. 1-4 of the drawings, a portable underwater signalling transducer 10 is provided which includes a central generally cylindrical body 11. A first housing 12 is connected to one end of the body 11 in any desired manner, such as screw threads, welding or other watertight connection, and extends outwardly generally axially of such body. A second housing 13 is connected to the body 11 in any desired watertight manner and extends axially outwardly from the other end thereof. At the other end of the housing 12 a metal diaphragm 14 is disposed across the end of the housing 12 and is retained in position by a focusing cone 15. The outer end of the housing 13 is closed and sealed in any desired manner, as by a cap 16.

The body 11 is provided with an axial bore 17 which communicates with a counterbore 18 at one end and a counterbore 19 at the opposite end. A slide valve body 20 is slidably mounted in the bore 17 and such valve body is provided with a fixed valve 21 integrally connected adjacent to one end, and an adjustable valve 22 is mounted adjacent the opposite end. Each of the valves 21 and 22 is spaced inwardly from the end of the valve body 20 to provide outwardly extending projections 23 and 24, respectively, for a purpose which will be described later. An axial bore 25 extends entirely through the valve body 20 and slidably receives a hollow piston connecting rod 26. A piston 27, which is located within the housing 12, is connected to one end of the connecting rod 26 in any desired manner, as by a nut or hammer 28, and a piston 29, which is located within the housing 13, is connected to the opposite end of the connecting rod 26 by a nut 30. The piston 27 separates the interior of the housing 12 into inner and outer variable volume compartments 31 and 32, respectively, while the piston 29 separates the interior of the housing 13 into inner and outer variable volume compartments 33 and 34, respectively. A return spring or other resilient member 35 is disposed within the outer compartment 34 of the housing 13 and extends between the piston 29 and the cap 16, and a buffer spring 36 is disposed within the counterbore 19 to urge the fixed valve 21 outwardly.

At one side of the transducer body 11 an enlargement 38 is provided having a threaded recess 39 for the reception of a hose fitting (not shown) for connecting one end of a flexible hose to the transducer. The opposite end of the hose is connected to a source of air under high pressure, such as the air tank of the scuba gear. The inner end of the recess 39 has an inlet port 40 which communicates with a channel 41 that extends lengthwise of the transducer body 11. At one end of the channel 41 an opening 42 provides communication between the channel 41 and the counterbore 18 and at the opposite end of the channel 41 an opening 43 provides communication between the channel 41 and the counterbore 19.

A stop ring 44 is located at one end of the transducer body 11 between such body and the housing 12 so that when the valve body 20 is moved to the left, as illustrated in FIG. 1, the adjustable valve 22 engages the stop ring 44 and prevents further movement of the valve body. An exhaust channel 45 in the valve body 20 provides communication between the inner compartment 31 of the housing 12 and the counterbore 18 of the body 11. The stop ring 44 is provided with an opening 46 in alignment with the exhaust channel 45 to permit air to pass from the inner compartment 31 into the exhaust channel 45. At the opposite end of the transducer body 11, an exhaust channel 47 provides communication between the inner compartment 33 and the counterbore 19. The central portion of the valve body 20 has a relatively wide annular groove 48 which selectively communicates with the counterbore 18 or the counterbore 19 depending upon the position of the valve body 20.

A second enlargement 52 is provided on the transducer body 11 and such second enlargement normally is in diametrically opposed relationship with the enlargement 38. The second enlargement has a threaded recess 53 which receives a hollow plug 54 having an opening 55 through the outer end. A passageway 56 extends through the transducer body 11 and provides communication between the axial bore 17 and the threaded recess 53. The outer end of the hollow plug 54 defines a valve seat 57 which normally engages a valve 58 to prevent the passage of air. The valve 58 includes an operating stem 59 which projects through the opening 55 to a position exteriorly of the enlargement 52 where it is readily accessible for unseating the valve 58 when desired. A spring 60 or other resilient member is disposed within the hollow plug 54 and bears against the valve 58 to urge the valve into intimate engagement with the valve seat 57.

In the operation of this embodiment, when the components are in the position illustrated in FIG. 1, the pressures in the inner and outer compartments 31, 32, 33 and 34 are substantially equal due to leakage between the movable components. When the operating stem 59 is moved, high pressure air enters the transducer body 11 through the inlet port 40 into the channel 41. At this time, the opening 43 at the righthand end of such channel is blocked by the fixed valve 21 and therefore the high pressure air flows through the opening 42 into the inner compartment 31 between the piston 27 and the transducer body 11. The high pressure air within the compartment 31 moves the piston 27, piston connecting rod 26, and the piston 29 to the left, as illustrated in FIG. 1, toward the diaphragm 14.

Air in the outer compartment 32 passes through the hollow connecting rod 26 into the outer compartment 34 at the opposite end of the transducer so that the air within the outer compartments cannot be compressed which would resist movement of the connecting rod and the pistons. Leftward movement of the pistons 27 and 29 and the connecting rod 26 constitutes the power stroke of the transducer and during this power stroke air trapped in the inner compartment 33 in the housing 13 passes through the exhaust channel 47 into the counterbore 19, into annular groove 48, and then through the passageway 56 where such air passes around the valve 58 and is exhausted to the water. As the pistons 27 and 29 and the connecting rod 26 approach the end of the power stroke, the piston 29 engages the righthand projection 24 of the valve body 20 and slides such valve body to the left. Movement of the valve body 20 to the left causes the adjustable valve 22 to close the opening 42 and simultaneously causes the fixed valve 21 to open the opening 43 just prior to the time that the nut 28 strikes the diaphragm 14 and generates acoustic sound waves in the water.

Figure 3:
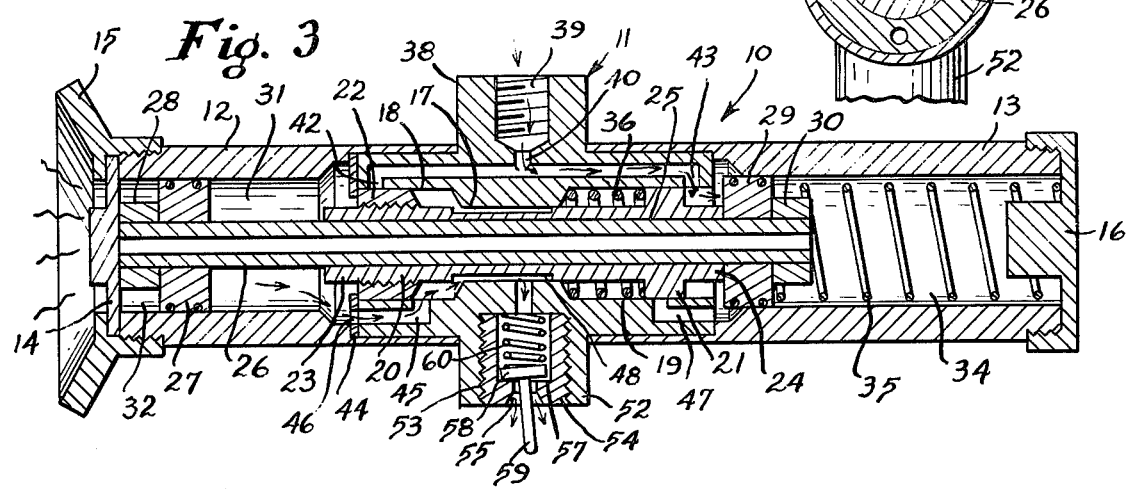
FIG. 3 is a section similar to FIG. 1 illustrating the position of the components at the completion of the power stroke and in position to begin the return stroke.

After the impact between the nut 28 and the diaphragm 14, high pressure air passes through the channel 41 and the opening 43 into the counterbore 19, as illustrated in FIG. 3, so that the inner compartment 33 becomes pressurized. The movement of the slide valve body 20 closes the exhaust channel 47 and simultaneously opens the exhaust channel 45 so that air under pressure in the inner compartment 31 at the lefthand end of the transducer is exhausted to the water.

Figure 4:
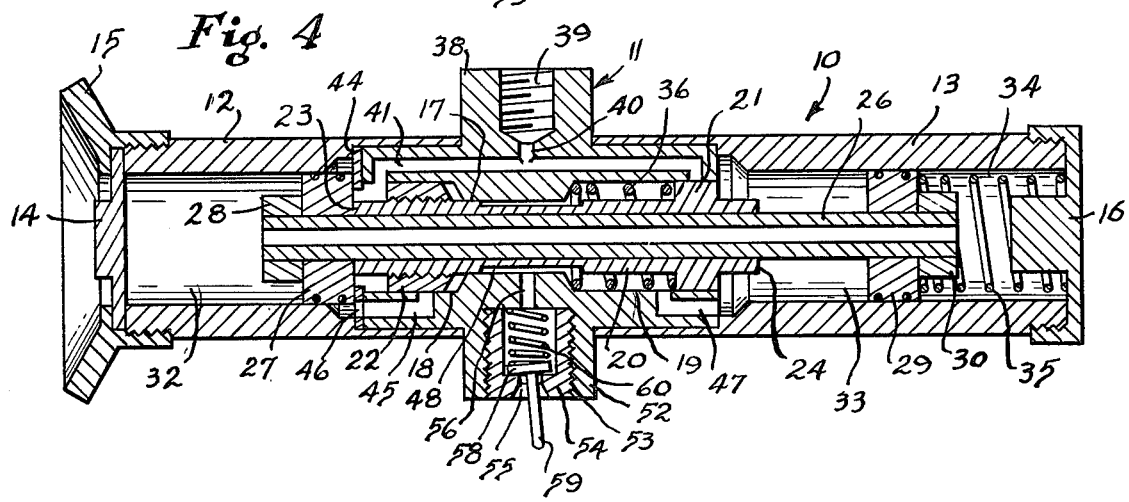
FIG. 4 is a section similar to FIG. 1 illustrating the position of the components at the end of the return stroke and ready to begin the power stroke.

The introduction of air under pressure into the inner compartment 33 maintains the slide valve body 20 in the lefthand position and simultaneously moves the piston 29, connecting rod 26 and piston 27 to the right, as shown in the drawings, on the return stroke. As the pistons and connecting rod approach the end of the return stroke, the piston 27 engages the projection 23 at the lefthand end of the slide valve body 20, as illustrated in FIG. 4, and moves the valve body to the right. This movement of the valve body causes the fixed valve 21 to close the opening 43 and causes the adjustable valve 24 to open the opening 42 and reestablish the condition necessary for the power stroke so that the nut 28 again will strike the diaphragm 14.

This cycling or sequential reciprocation of the slide valve body 20 and the connecting rod 26 continues as long as the valve 58 is open. When the operating stem 59 is released, the valve 58 engages the valve seat 57 to stop the egress of air from the transducer and the springs 35 and 36 urge the components toward starting position, as illustrated in FIG. 1, due to leakage between the components. In the event that the operating stem 59 is moved before the components have returned to the starting position, the transducer will continue with the cycle that the components were in at the time that the valve 58 was returned to the valve seat 57.

With particular reference to FIGS. 5-8, a modified form of the invention is provided in which a transducer 65 has a body 66 having housings 67 and 68 extending outwardly from opposite ends thereof. The outer end of the housing 67 has a diaphragm 69 retained thereon by a focusing cone 70 and the outer end of the housing 68 is closed by a cap 71. The transducer body 66 is provided with an axial bore 72 and a concentric counterbore 73 extending inwardly from the end of the body adjacent to the housing 68. A slide valve body 74 is slidably mounted within the axial bore 72 and such slide valve body has a stop flange 75 at one end and a valve 76 adjustably mounted at the opposite end. The slide valve body 74 is provided with an axial bore 77 which slidably receives a hollow connecting rod 78. A pair of steel disks 79 and 80 which are separated from each other by a spacer 81 are mounted on one end of the connecting rod 78 in such a manner that the inner disk engages a collar 82 while the outer disk engages a nut or hammer 83 carried by the connecting rod. A piston 84 is mounted on the other end of the connecting rod by a nut 85. The housing 67 is provided with a hollow tubular sleeve 86 with a serrated inner periphery 87 defining a multiplicity of lands and grooves, and the steel disks 79 and 89 engage the lands of the serrations 87 when the connecting rod 78 is moved in either direction.

The steel disks 79 and 80 separate the housing 67 into inner and outer variable volume compartments 90 and 91, respectively, and the piston 84 separates the housing 68 into inner and outer variable volume compartments 92 and 93, respectively. A drive spring 94 is positioned within the outer compartments 93 and normally urges the connecting rod 78 toward the left, as illustrated in FIG. 6.

The transducer body 66 has a threaded recess 95 for the reception of one end of an air hose (not shown) which is connected to a source of air under pressure, such as the air tank of the scuba gear. The recess 95 communicates with an inlet port 96 which extends through the body 66 to the bore 72. In order to introduce air under pressure into the inner compartment 92 during the return stroke of the connecting rod 78, the slide valve body 74 has an annular groove 97 which is aligned with the inlet port 96 when the slide valve body 74 has been moved to the left (FIG. 6). With particular reference to FIG. 8, the annular groove 97 also communicates with a channel 98 having a first leg 99 extending radially outwardly from the bore 72 and a second leg 100 which extends longitudinally of the transducer body generally parallel to the axis thereof and such second leg communicates with the inner compartment 92. The counterbore 73 communicates with a pair of diametrically opposed passageways 101 (FIGS. 6 and 7) so that when the piston 84 is spaced from the counterbore 73, as shown in FIG. 5, air from the inner compartment 92 may pass through such counterbore and the passageways 101 into the inner compartment 90 on the opposite side of the transducer body 66.

The transducer body 66 is provided with a threaded recess 102 which normally is diametrically opposite the threaded recess 95 and such threaded recess 102 receives a hollow plug 103 having an opening 104 at its outer end. The outer wall of the plug 103 defines a valve seat 105 which normally engages a valve 106 having an operating stem 107 extending outwardly through the opening 104. A spring or other resilient member 108 is located within the hollow plug 103 and urges the valve 106 into intimate engagement with the valve seat 105.

An exhaust channel 109 extends from the inner compartment 90 of the housing 67 through the transducer body 66 and communicates with the interior of the hollow plug 103. Preferably the adjustable valve 76 has an outwardly extending stop flange 110 and a buffer spring 111 located within the counterbore 73 which engages the inner end of the adjustable valve.

In the operation of this embodiment, the transducer normally is in a position intermediate the positions shown in FIGS. 5 and 6 with the pressure in the inner and outer compartments 90, 91, 92 and 93 being substantially equalized due to some leakage of high pressure air from the air tank through the components. When the operating stem 107 is moved, the valve 106 is unseated so that the pressure within the inner compartment 90 is relieved. Since the inner compartment 92 communicates with the inner compartment 90 through the passageways 101 and the counterbore 73, the pressure within the inner compartment 92 likewise is relieved. When this condition occurs, the drive spring 94 moves the piston 84 to the left to cause the nut or hammer 83 to strike the diaphragm 69 and generate acoustic sound waves which travel through the water.

As the nut 83 approaches the diaphragm at the end of the power stroke, the piston 84 at the opposite end of the connecting rod engages the adjustable valve 76 and moves the slide valve body 74 to the left so that the adjustable valve is received within the counterbore 73 where it interrupts the communication between the inner compartments 90 and 92. The piston 84 moves the adjustable valve into the counterbore until the stop flange 110 engages the transducer body 66. In this position the annular groove 97 in the slide valve body 74 is aligned with the inlet port 96 so that high pressure air enters the channel 98 (FIG. 8) and is discharged into the inner compartment 92. High pressure air within the inner compartment 92 drives the piston 84 to the right against the tension of the drive spring 94 and simultaneously holds the adjustable valve 76 in position against the transducer body 66. As the connecting rod 78, steel disks 79 and 80, and the piston 84 are moved to the right, air from the inner compartment 90 is exhausted through the exhaust channel 109 where it passes around the valve 106 and is discharged into the water.

Just before completion of the return stroke of the connecting rod 78, the collar 82 engages the slide valve body 74 and moves the body to the right so that the annular groove 97 is moved out of alignment with the inlet port 96 to interrupt the introduction of air under pressure into the inner compartment 92. Simultaneously the adjustable valve 76 is moved out of the counterbore 73 so that communication between the inner compartments 90 and 92 is reestablished and the drive spring 94 again moves the connecting rod 78 to the left in the power stroke. During both the power stroke and the return stroke, the steel disks 79 and 80 slide along the lands and grooves of the serrations 87 and cause a substantially continuous clattering noise to be given off by the transducer. The operation continues as long as the valve 106 is open.

Although both of the previous embodiments have been illustrated and described as creating an impact at one end only of the transducer, it is noted that the caps 16 and 71 could be replaced with another diaphragm and focusing cone which would be engaged by the nuts 30 and 85 to impart acoustic waves from each end of the transducer. In this event, the diaphragms on opposite ends of the transducer could be of different tonal qualities or could be of substantially the same tonal quality.

With particular reference to FIG. 9, another embodiment of an operating valve is produced which may be substituted for the operating valve of either of the transducers 10 or 65. In this embodiment an enlargement 115 of the transducer body has a recess 116 which communicates with the exhaust channel or passageway 56 of the transducer 10 or the exhaust channel or passageway 109 of the transducer 65. A hollow plug 117 is threadedly received within the recess 116 and such plug has an axial bore 118 which slidably receives the stem 119 of a valve 120 having a push button 121 on its outer end. The inner end of the hollow plug 117 defines a valve seat 122 which is normally engaged by the valve 120. A spring or other resilient member 123 within the recess 116 urges the valve 120 into intimate engagement with the valve seat 122.

The hollow plug 117 extends through a passageway 124 in the enlargement 115 and such passageway terminates in a threaded recess 125 which is adapted to receive a hose fitting (not shown). In the area of the hollow plug 117 which passes through the passageway 124, such hollow plug is provided with one or more openings 126 so that air being discharged from the transducer passes through the hollow plug and through the openings 126 into the passageway 124 and is discharged through the hose. The opposite end of the hose preferably is connected to a storage chamber such as a body compensating bladder, or could be connected directly to the face mask of the skin diver for breathing purposes so that no air from the diver's tank is wasted to the water.

We claim:

1. A portable selectively operated underwater signalling transducer for transmitting an audible signal from one location to another location comprising a body having an axial bore extending therethrough, a housing connected to said body and having a sound generating diaphragm at one end, a slide valve slidably mounted in the bore of said body, said slide valve having an axial bore, a connecting rod slidably mounted in the bore of said slide valve, piston means mounted on each end of said connecting rod, means for connecting said body to a source of air under pressure, said slide valve including airflow directing means for controlling the flow of air under pressure within said body for moving said connecting rod alternately in opposite directions so that said connecting rod strikes said diaphragm to generate acoustic waves, said slide valve having portions extending outwardly of said body in a position to be engaged by said pistons so that movement of said pistons causes said slide valve to move and direct the air under pressure in a different direction, and a selectively operable manually actuated control valve for controlling the flow of air under pressure through said body to cause said connecting rod to reciprocate.

2. A portable selectively operated underwater signalling transducer for transmitting an audible signal from one location to another location, comprising a body, means for connecting said body to a source of air under pressure for introducing air under pressure into said body, a housing connected to said body, sound generating means carried by said housing, slide valve means slidably mounted within said body, said slide valve means having airflow directing means for selectively directing the flow of air under pressure through said body, connecting rod means slidably carried by said slide valve means for alternate movement in forward and rearward directions, said connecting rod means being moved by said air under pressure, said connecting rod means engaging and moving said slide valve means during a portion of its forward and rearward movement to cause said airflow directing means to reverse the flow of air under pressure through said body and thereby reverse the direction of movement of said connecting rod means, means on said connecting rod means for operatively actuating said sound generating means, and means for manually actuating the flow of air under pressure through said body.

3. The structure of claim 2 in which said sound generating means includes a diaphragm mounted on said housing in a position to be engaged by at least one end of said connecting rod means.

4. The structure of claim 2 including piston means on each end of said connecting rod means, and outwardly extending projections on said slide valve means for engagement by said piston means to cause said slide valve means to move.

5. The structure of claim 2 in which said airflow directing means includes at least one valve to assist in controlling the flow of air under pressure within said body.

6. The structure of claim 2 in which said housing includes a serrated inner periphery, and said piston means includes at least one disk which engages said serrated inner periphery, whereby movement of said disk along said serrated inner periphery operatively activates additional acoustic means.

* * * * *